(12) United States Patent
Koshio et al.

(10) Patent No.: US 8,427,625 B2
(45) Date of Patent: Apr. 23, 2013

(54) OPTICAL DISPLAY DEVICE MANUFACTURING SYSTEM AND METHOD FOR MANUFACTURING OPTICAL DISPLAY DEVICE

(75) Inventors: Satoru Koshio, Ibaraki (JP); Takuya Nakazono, Ibaraki (JP); Kazuo Kitada, Ibaraki (JP); Tomokazu Yura, Ibaraki (JP); Kentarou Takeda, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 309 days.

(21) Appl. No.: 12/900,940

(22) Filed: Oct. 8, 2010

(65) Prior Publication Data

US 2011/0025958 A1   Feb. 3, 2011

Related U.S. Application Data

(63) Continuation-in-part of application No. PCT/JP2009/057430, filed on Apr. 13, 2009.

(30) Foreign Application Priority Data

Apr. 14, 2008  (JP) ................................ 2008-104961
Apr. 10, 2009  (JP) ................................ 2009-095562

(51) Int. Cl.
*G02F 1/13* (2006.01)
(52) U.S. Cl.
USPC ........................................................ 349/187
(58) Field of Classification Search .................... 349/187
See application file for complete search history.

(56) References Cited

U.S. PATENT DOCUMENTS 7,738,064 B2 *   6/2010   Otoshi et al. .................. 349/119

2005/0016670 A1   1/2005   Kanbara et al.
(Continued)

FOREIGN PATENT DOCUMENTS

JP    2004-333647 A   11/2004
JP    2005-037416 A    2/2005
(Continued)

OTHER PUBLICATIONS

Japanese Office Action dated Mar. 24, 2011, issued in corresponding Japanese Pantent Application No. 2009-095562.

(Continued)

*Primary Examiner* — James Dudek
(74) *Attorney, Agent, or Firm* — Westerman, Hattori, Daniels & Adrian, LLP

(57) ABSTRACT

Provided are an optical display device manufacturing system and a method for manufacturing an optical display device which can bond optical films to both surfaces of a liquid crystal cell in good condition with a simpler constitution. A first optical film F11 is fed in an orthogonal direction with respect to the width direction from a first material roll R1 formed by winding the first optical film F11 in such a manner that an absorption axis B1 extends in the orthogonal direction, and then the first optical film F11 is cut and bonded to one surface of a liquid crystal cell. A second optical film F21 is fed in an orthogonal direction with respect to the width direction from a second material roll R2 formed by winding the second optical film F21 in such a manner that an absorption axis B2 extends in the width direction, and then the second optical film F21 is cut and bonded to the other surface of the liquid crystal cell. Accordingly, it is possible to bond the first optical film F11 and the second optical film F21 in the crossed nicols relation, without the provision of the mechanism for rotating the liquid crystal cell W or the like.

6 Claims, 6 Drawing Sheets

U.S. PATENT DOCUMENTS

| | | |
|---|---|---|
| 2006/0119775 A1 | 6/2006 | Nakata et al. |
| 2006/0124248 A1 | 6/2006 | Kanbara et al. |
| 2007/0091228 A1 | 4/2007 | Itadani et al. |
| 2007/0242188 A1 | 10/2007 | Sakai |
| 2009/0122243 A1 | 5/2009 | Sugiyama et al. |
| 2009/0159175 A1 | 6/2009 | Nakahira et al. |
| 2009/0218049 A1 | 9/2009 | Kanbara et al. |

FOREIGN PATENT DOCUMENTS

| | | |
|---|---|---|
| JP | 2005-037417 A | 2/2005 |
| JP | 2005-242345 A | 9/2005 |
| JP | 2006-184640 A | 7/2006 |
| JP | 2006-189781 A | 7/2006 |
| JP | 2007-140046 A | 6/2007 |
| JP | 2008-003188 A | 1/2008 |
| WO | 2006/001448 A1 | 1/2006 |

OTHER PUBLICATIONS

Chinese Office Action dated May 3, 2012, issued in corresponding Chinese Patent Application No. 200980109481.1.(9 pages).

International Search Report of PCT/JP2009/057430, mailing date Jul. 14, 2009.

Japanese Office Action dated Aug. 19, 2010, issued for corresponding Japanese Patent Application No. 2009-095562.

Notification of Transmittal of Translation of the International Preliminary Report on Patentability (Form PCT/IB/338) of International Application No. PCT/JP2009/057430 mailed Dec. 9, 2010 with Forms PCT/IB/373 and PCT/ISA/237.

Japanese Office Action dated Dec. 10, 2010, issued in corresponding Japanese Patent Application No. 2009-095562.

\* cited by examiner

OPTICAL DISPLAY DEVICE MANUFACTURING SYSTEM AND METHOD FOR MANUFACTURING OPTICAL DISPLAY DEVICE

TECHNICAL FIELD

The present invention relates to an optical display device manufacturing system and a method for manufacturing an optical display device for manufacturing an optical display device by feeding an optical film from a material roll, which is formed by winding the optical film, and bonding the film to a liquid crystal cell.

BACKGROUND ART

A manufacturing method of an optical display device mounted to a conventional liquid crystal display device is conceptually shown in FIG. 6. First, in an optical filmmaker, a step produces a long (web-like) optical film as a material roll (#1). The concrete manufacturing step is a known manufacturing step, and a description thereof will not be given. As the long (web-like) optical film as a material roll, for example, there are a polarizing plate material, a retardation plate material, a laminated film material of the polarizing plate and the retardation plate, and the like which are used in a liquid crystal display device. Next, the material roll is slit to a predetermined size (a size in accordance with a size of the liquid crystal cell) (#2). Next, the slit long material is cut to a fixed size in conformity to a size of the liquid crystal cell (#3). Next, a step inspects an outer appearance of a piece of optical film cut to the fixed size (#4). As the inspecting method, for example, there can be listed up a defect inspection in accordance with a visual observation, and an inspection using a known defect inspection apparatus. The defect means, for example, a dirty in a front surface or an internal portion, a scratch, a special twisted defect like a hitting mark generated by biting a contaminant (which may be called as a knick), an air bubble, a contaminant or the like. Next, a step inspects a finished product (#5). The final product inspection is an inspection in accordance with a quality standard having a severer non-defective determination than the outer appearance inspection. Next, a step works end face treatment in four sides of the piece of optical film (#6). This step is carried out for preventing an adhesive or the like from running over from the end faces during transport. Next, a step cleanly packages the piece of optical film under a clean room environment (#7). Next, a step packages for transport (a transport package) (#8). The piece of optical film is produced as mentioned above, and is transported to a panel processing manufacturer.

In the panel processing manufacturer, a step opens the package of the piece of optical film transported (#11). Next, a step inspects an outer appearance for inspecting the scratch, the dirt and the like generated at a time of transporting or opening the package (#12). The piece of optical film which is determined as a non-defective by the inspection is fed to the next step. There is a case that the outer appearance inspection is omitted. A liquid crystal cell to which the piece of optical film is bonded is previously produced, and the liquid crystal cell is cleaned before the bonding step (#13).

A step bonds the piece of optical film to the liquid crystal cell (#14). A release film is peeled off from the piece of optical film while leaving a pressure-sensitive adhesive layer, and it is bonded to one face of the liquid crystal cell by using the pressure-sensitive adhesive layer as a bonding surface. Further, it can be bonded to the other surface of the liquid crystal cell in the same manner. In the case of bonding to both the surfaces, the structure may be made such that the optical films having the same construction are bonded to the surfaces of the liquid crystal cell, or the structure may be made such that the optical films having different constructions are bonded thereto. Next, a step carries out an inspection of the optical display device in the state in which the optical film is bonded and a defect inspection (#15). The optical display device which is determined as a non-defective in this inspection is fed to a mounting process to be mounted (#16). On the other hand, a reworking process is applied to the optical display device which is determined as a defective (#17). In the reworking process, the optical film is peeled off from the liquid crystal cell. The optical film is newly bonded to the reworked liquid crystal cell (#14).

In the manufacturing step mentioned above, since the optical film maker and the panel processing manufacturer exist in the separate places, the end face treatment, the packaging of the piece of optical film, the package opening and the like are particularly necessary steps. However, there are a problem of a manufacturing cost increase caused by multiple steps, a problem of the scratch, the dust, the dirt and the like generated by the multiple steps and the transport, a necessity of the inspection step caused thereby, and a problem that it is necessary to store and manage many kinds of optical films as a stock.

As a method of solving the problems, there has been proposed Japanese Unexamined Patent Publication No. 2007-140046 (Patent Document 1). In accordance with this method, the structure is provided with supply means pulling out and supplying a long optical film from a material roll around which the optical film corresponding to a member of an optical display device is wound, detection means detecting a defect of the optical film pulled out by the supply means, cutting work means cutting the optical film based on a result of detection of the detection means and working to an individual optical film, transfer means transferring the optical film cut by the cutting work means for a bonding work, and bonding work means bonding the optical film transferred by the transfer means to a liquid crystal cell which is a member of an optical display device, and these means are arranged on a continuous manufacturing line. In the structure mentioned above, it is possible to directly cut the long optical film into a desired size, and to bond the cut optical film to the liquid crystal cell. Accordingly, it is possible to directly package the long optical film wound around the material roll so as to deliver, in place of the conventional step which stamps the long optical film, tightly packages the stamped optical film, and delivers to the panel processing manufacturer.

In Japanese Unexamined Patent Publication No. 2005-37416 (Patent Document 2), there is disclosed an example of a technique for cutting a long optical film (a long film), and bonding the film to a liquid crystal cell (a substrate) as mentioned above. In this technique, there is employed a polarizing plate in which a polarization axis (a transmission axis) is oriented in parallel to a film longitudinal direction, or a polarizing plate in which a polarization axis is oriented vertically to the film longitudinal direction.

In Japanese Unexamined Patent Publication No. 2005-37417 (Patent Document 3), there is disclosed a structure in which a direction of a polarization axis (a direction of a transmission axis) of a film piece bonded to one surface of a liquid crystal cell is oriented vertically to a direction of a polarization axis of a film piece bonded to the other surface, at a time of bonding the films to both surfaces of a liquid crystal cell (a substrate) after cutting a long optical film (a long film).

PRIOR ART DOCUMENTS

Patent Documents

Patent Document 1: Japanese Unexamined Patent Publication No. 2007-140046
Patent Document 2: Japanese Unexamined Patent Publication No. 2005-37416
Patent Document 3: Japanese Unexamined Patent Publication No. 2005-37417

DISCLOSURE OF THE INVENTION

Problems to be Solved by the Invention

FIG. 5 is a schematic view showing an example of an aspect which can be thought as a bonding aspect of optical films F11 and F21 with respect to a liquid crystal cell W. In this example, the first optical film F11 is bonded to one surface of the liquid crystal cell W, and the second optical film F21 is bonded to the other surface, whereby the optical films F11 and F21 are bonded to both surfaces of the liquid crystal cell W.

The first optical film F11 is fed in an orthogonal direction to a width direction of the first optical film F11, from a first material roll R1 formed by winding the first optical film F11 around a core A1. In the same manner, the second optical film F21 is fed in an orthogonal direction to a width direction of the second optical film F21, from a second material roll R2 formed by winding the second optical film F21 around a core A2. The first optical film F11 and the second optical film F21 respectively have polarization axes B1 and B2 extending in orthogonal directions to the width directions, that is, the polarization axes B1 and B2 extend in feeding directions of the respective optical films F11 and F21, and they are constituted such that they can allow to pass only lights oscillating along the polarization axes B1 and B2.

First, the first optical film F11 is bonded to one surface of the liquid crystal cell W. A width along the core A1 of the first optical film F11 corresponds to a short side of the liquid crystal cell W, and the first optical film. F11 is cut in a width direction at an interval corresponding to a long side of the liquid crystal cell W, whereby the first optical film F11 having a shape corresponding to the liquid crystal cell W is formed. Further, after the first optical film F11 cut is bonded to the one surface of the liquid crystal cell W, the liquid crystal cell W is rotated at 90 degree in a horizontal plane by a panel rotating mechanism, and the second optical film F21 is bonded to the other surface.

A width along the core A2 of the second optical film F21 corresponds to the long side of the liquid crystal cell W, and the second optical film F21 is cut in a width direction at an interval corresponding to the short side of the liquid crystal cell W, whereby the second optical film F21 having a shape corresponding to the liquid crystal cell W is formed. The second optical film F21 cut as mentioned above is bonded to the other surface of the liquid crystal cell W, whereby the liquid crystal cell W in which the optical films F11 and F21 are bonded to both surfaces is obtained.

The polarization axes of the optical films F11 and F21 bonded respectively to both the surfaces of the liquid crystal cell W can be orthogonal to each other to achieve a crossed nicols relation, which is done by bonding the first optical film F11 to the one surface of the liquid crystal cell W, thereafter rotating the liquid crystal cell W at 90 degree in the horizontal plane by the panel rotating mechanism, and bonding the second optical film F21 to the other surface, as mentioned above.

However, in the embodiment mentioned above, since it is necessary to set the panel rotating mechanism, there is such a problem that the system is complicated. Further, since the optical films F11 and F21 can not be bonded simultaneously to both the surfaces of the liquid crystal cell W, there is such a problem that efficiency is not good. Particularly, in the case of cutting the first optical film F11, like in the example mentioned above, at the interval corresponding to the long side of the liquid crystal cell W, since a time for feeding the first optical film F11 from the first material roll R1 for obtaining a piece of the first optical film F11 cut becomes longer than that in the case of cutting at the interval corresponding to the short side of the liquid crystal cell W, efficiency is further deteriorated.

In Patent Document 2, there is described an orientation direction of a polarization axis in a polarizing plate bonded to one surface of a liquid crystal cell, however, there is no description relating to a case where the polarizing plates are bonded to both surfaces of the liquid crystal cell, and a relationship between the respective polarization axes of the polarizing plates bonded to both the surfaces is not taken into consideration. Accordingly, in a case where the polarizing plates are bonded to both the surfaces of the liquid crystal cell, it is not necessarily possible to bond in good condition with regard to the orientation direction of the polarization axis even by using the technique described in Patent Document 2.

In Patent Document 3, there is disclosed a constitution in which a direction of a polarization axis of a film piece bonded to one surface of a liquid crystal cell is oriented vertically to a direction of a polarization axis of a film piece bonded to the other surface. However, the direction of the polarization axis in each of the film pieces intersects with a width direction of the optical film, and a direction which is orthogonal to the width direction (see FIG. 3). In the case of stretching (diagonally stretching) in such a manner that the polarization axis intersects with the width direction of the optical film and the direction which is orthogonal to the width direction as mentioned above, it is necessary to precisely control a speed ratio and scale factor of right and left tenters, and axial precision is hard to be obtained. Accordingly, in the case of bonding the polarizing plates each having low axial precision in such a manner as to align with a short side or long side of the liquid crystal cell, there is a high possibility that they are bonded in a state in which the polarization axes are out of alignment, and a contrast abnormality of an optical display device caused by the deviation of the polarization axes tends to be generated.

The present invention is made by taking the above situation into consideration, and an object of the present invention is to provide an optical display device manufacturing system and a method for manufacturing an optical display device which can bond optical films to both surfaces of a liquid crystal cell in good condition with a simpler constitution. Further, an object of the present invention is to provide an optical display device manufacturing system and a method for manufacturing an optical display device which can efficiently bond the optical films to both the surfaces of the liquid crystal cell.

Means for Solving the Problems

As a result of making efforts to study for solving the problem mentioned above, inventors have reached a completion of the present invention mentioned below.

An optical display device manufacturing system according to a first aspect of the present invention relates to a system for manufacturing a rectangular optical display device by cutting an optical film in a width direction to be a predetermined size, which is fed from a material roll formed by winding said optical film including a polarizer, and bonding the optical film to a rectangular liquid crystal cell, comprising:

a first feeder feeding a first optical film from a first material roll, which is formed by winding said first optical film having a width corresponding to a length of a short side of said liquid crystal cell, in a direction perpendicular to the width direction, the first optical film having an absorption axis which extends in a direction perpendicular to the width direction;

a second feeder feeding a second optical film from a second material roll, which is formed by winding said second optical film having the same width as that of said first optical film and is arranged in such a manner that a width direction is arranged parallel to the width direction of said first material roll, in a direction perpendicular to the width direction, the second optical film having an absorption axis which extends in the width direction;

a first cutting apparatus cutting the first optical film fed from said first feeder in an interval corresponding to a length of the long side of said liquid crystal cell;

a second cutting apparatus cutting the second optical film fed from said second feeder in the same interval as that of said first optical film;

a first bonding apparatus bonding a cut piece of said first optical film to one surface of said liquid crystal cell; and a second bonding apparatus bonding a cut piece of said second optical film to the other surface of said liquid crystal cell, wherein said first optical film is bonded to a front surface of the liquid crystal cell in a way that the absorption axis of the first optical film extends in a horizontal direction, the front surface and the horizontal direction being defined under condition at a time of viewing the optical display device, and wherein said second optical film is bonded to a back surface of the liquid crystal cell in a way that the absorption axis of the second optical film extends in a vertical direction, the back surface and the vertical direction being defined under condition at a time of viewing the optical display device.

In accordance with this constitution, the first optical film which is fed from the first material roll and cut, and the second optical film which is fed from the second material roll and cut are bonded respectively to both the surfaces of the liquid crystal cell in such a manner that the absorption axes thereof are orthogonal to each other. Accordingly, since it is possible to set the first optical film and the second optical film, which are bonded respectively to both the surfaces of the liquid crystal cell, to the crossed nicols relation, without setting the mechanism for rotating the liquid crystal cell or the like, it is possible to bond the optical films to both the surfaces of the liquid crystal cell in good condition with a simpler constitution.

Particularly, since the first optical film is wound in such a manner that the absorption axis extends in the orthogonal direction to the width direction, and the second optical film is wound in such a manner that the absorption axis extends in the width direction, it is easy to align the absorption axis of each of the optical films with the long side or short side of the liquid crystal cell. Accordingly, since there is a low possibility that the absorption axis is deviated at a time of bonding the optical film to the liquid crystal cell, and the contrast abnormality of the optical display device caused by the deviation of the absorption axis is hardly generated, it is possible to bond the optical films to both the surfaces of the liquid crystal cell in good condition. Further, it is possible to effectively improve the contrast of the optical display device.

An optical display device manufacturing system according to a second aspect of the present invention relates to the system for manufacturing a rectangular optical display device, wherein the system is constructed in such a manner that a period for which said first bonding apparatus bonds said first optical film to said one surface of said liquid crystal cell and a period for which said second bonding apparatus bonds said second optical film to said other surface of said liquid crystal cell overlap at least partly.

In accordance with this constitution, it is possible to bond the first optical film and the second optical film to both the surfaces of the liquid crystal cell in parallel at least at a certain period. Accordingly, since it is possible to simultaneously or continuously bond the first optical film and the second optical film in a state in which the liquid crystal cell is positioned, it is not necessary to position the liquid crystal cell at a time of bonding respectively, such as the case of independently bonding the first optical film and the second optical film. Accordingly, it is possible to cut down a positioning device, and it is possible to bond the optical films to both the surfaces of the liquid crystal cell in good condition with a simpler constitution.

An optical display device manufacturing system according to a third aspect of the present invention relates to the system for manufacturing a rectangular optical display device, further comprising a film positioning apparatus carrying out relative positioning between said first optical film and said second optical film.

In accordance with this constitution, it is possible to relatively position the first optical film and the second optical film, and it is possible to precisely bond them to the liquid crystal cell in the crossed nicols relation. Accordingly, it is possible to bond the optical films to both the surfaces of the liquid crystal cell in good condition.

A method for manufacturing an optical display device according to a fourth aspect of the present invention relates to a method for manufacturing a rectangular optical display device by cutting an optical film in a width direction to be a predetermined size, which is fed from a material roll formed by winding said optical film including a polarizer, and bonding the optical film to a rectangular liquid crystal cell, comprising:

a first feeding step of feeding a first optical film from a first material roll, which is formed by winding said first optical film having a width corresponding to a length of a short side of said liquid crystal cell, in a direction perpendicular to the width direction, the first optical film having an absorption axis which extends in a direction perpendicular to the with direction;

a second feeding step of feeding a second optical film from a second material roll, which is formed by winding said second optical film having the same width as that of said first optical film and is arranged in such a manner that a width direction is arranged parallel to the width direction of said first material roll, in a direction perpendicular to the width direction, the second optical film having an absorption axis which extends in the width direction;

a first cutting step of cutting the first optical film fed in said first feeding step in an interval corresponding to a length of the long side of said liquid crystal cell;

a second cutting step of cutting the second optical film fed in said second feeding step in the same interval as that of said first optical film;

a first bonding step of bonding a cut piece of said first optical film to one surface of said liquid crystal cell; and a second bonding step of bonding a cut piece of said second optical film to the other surface of said liquid crystal cell, wherein said first optical film is bonded to a front surface of the liquid crystal cell in a way that the absorption axis of the first optical film extends in a horizontal direction, the front surface and the horizontal direction being defined under condition at a time of viewing the optical display device, and wherein said second optical film is bonded to a back surface of the liquid crystal cell in a way that the absorption axis of the second optical film extends in a vertical direction, the back surface and the vertical direction being defined under condition at a time of viewing the optical display device.

In accordance with this constitution, a method for manufacturing an optical display device having effects similar to the optical display device manufacturing system according to the first aspect of the present invention is provided.

A method for manufacturing an optical display device according to a fifth aspect of the present invention relates to the method for manufacturing an optical display device, wherein a period for bonding said first optical film to said one surface of said liquid crystal cell in said first bonding step and a period for bonding said second optical film to said other surface of said liquid crystal cell in said second bonding step overlap at least partly.

In accordance with this constitution, a method for manufacturing an optical display device having effects similar to the optical display device manufacturing system according to the second aspect of the present invention is provided.

A method for manufacturing an optical display device according to a sixth aspect of the present invention relates to the method for manufacturing an optical display device, further comprising a film positioning step of carrying out relative positioning between said first optical film and said second optical film.

In accordance with this constitution, a method for manufacturing an optical display device having effects similar to the optical display device manufacturing system according to the third aspect of the present invention is provided.

An optical display device according to a seventh aspect of the present invention relates to a rectangular optical display device manufactured by cutting an optical film in a width direction to be a predetermined size, which is fed from a material roll formed by winding said optical film including a polarizer, and bonding the optical film to a rectangular liquid crystal cell, wherein a first optical film is bonded to a front surface of the liquid crystal cell in a way that the absorption axis of the first optical film extends in a horizontal direction, the front surface and the horizontal direction being defined under condition at a time of viewing the optical display device, after feeding the first optical film from a first material roll, which is formed by winding said first optical film having a width corresponding to a length of a short side of said liquid crystal cell, in a direction perpendicular to the width direction, the first optical film having an absorption axis which extends in a direction perpendicular to the width direction, and cutting the first optical film fed from the first material roll in an interval corresponding to a length of the long side of said liquid crystal cell, and wherein a second optical film is bonded to a back surface of the liquid crystal cell in a way that the absorption axis of the second optical film extends in a vertical direction, the back surface and the vertical direction being defined under condition at a time of viewing the optical display device, after feeding the second optical film from a second material roll, which is formed by winding said second optical film having the same width as that of said first optical film in such a manner that the absorption axis of the second optical film extends in the width direction, in a direction perpendicular to the width direction, the second optical film having an absorption axis which extends in the width direction, and cutting the second optical film fed from the second material roll in the same interval as that of said first optical film.

Figure 1:
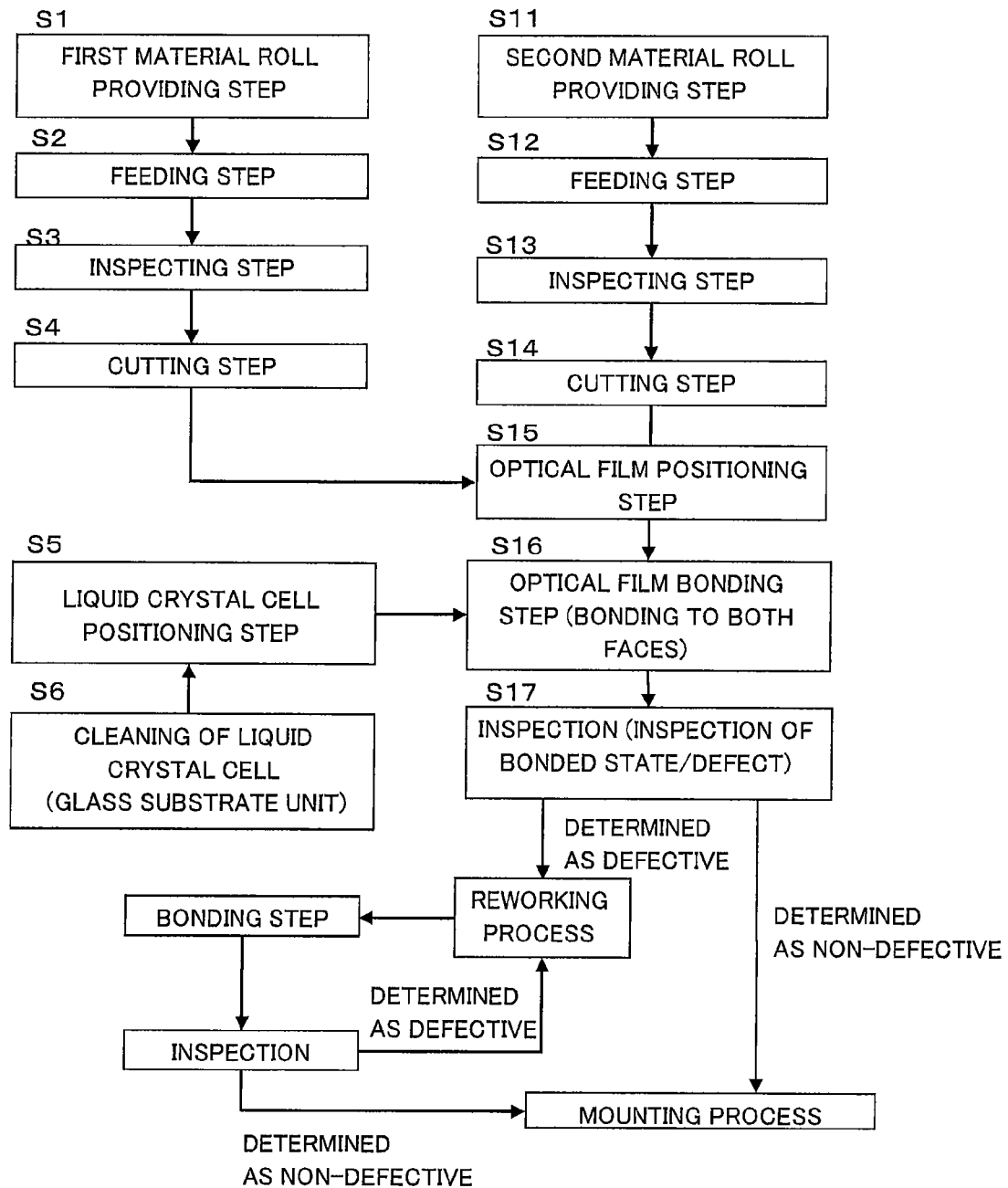
FIG. 1 is a flow chart of a method for manufacturing an optical display device in accordance with an embodiment 1.

DESCRIPTION OF THE SYMBOLS 12 first feeder
16 first cutting apparatus
18 first bonding apparatus
19 first film positioning apparatus
22 second feeder
26 second cutting apparatus
28 second bonding apparatus
29 second film positioning apparatus
F11 first optical film
F21 second optical film
R1 first material roll
A1 core
B1 polarization axis
R2 second material roll
A2 core
B2 polarization axis
W liquid crystal cell

MODES FOR CARRYING OUT THE INVENTION

First Embodiment

A description will be given below for a first embodiment in accordance with the present invention. FIG. 1 shows a flow chart of a manufacturing method of an optical display device in accordance with the first embodiment. A construction which is not provided with first and second defect inspection apparatuses, can be exemplified as the other embodiment of the manufacturing system in accordance with the first embodiment.

(Liquid Crystal Cell)

First, for example, a glass substrate unit, an organic electroluminescent (EL) light-emitting unit and the like can be listed up, as a liquid crystal cell used in the present invention. The liquid crystal cell is formed, for example, as a rectangular shape.

(Optical Film)

An optical film to be bonded to the liquid crystal cell is a film including a polarizer (a polarizer film), or may be a laminated film in which another film such as a retardation film, a brightness enhancement film or the like is combined with it. There is a case where a transparent film for protection is laminated on a surface of the optical film. Further, a pressure-sensitive adhesive layer is formed on one surface of the optical film in order to be bonded to the liquid crystal cell, and a release film for protecting the pressure-sensitive adhesive layer is provided. Further, the other surface of the optical film is provided with a surface protecting film through the pressure-sensitive adhesive layer interposed therebetween. Specific constitutions of these films will be mentioned later. In the following description, the optical film on which the surface protecting film and the release film are laminated through the pressure-sensitive adhesive layer interposed therebetween may be referred to as a sheet material.

(Manufacturing Flow Chart)

Figure 2:
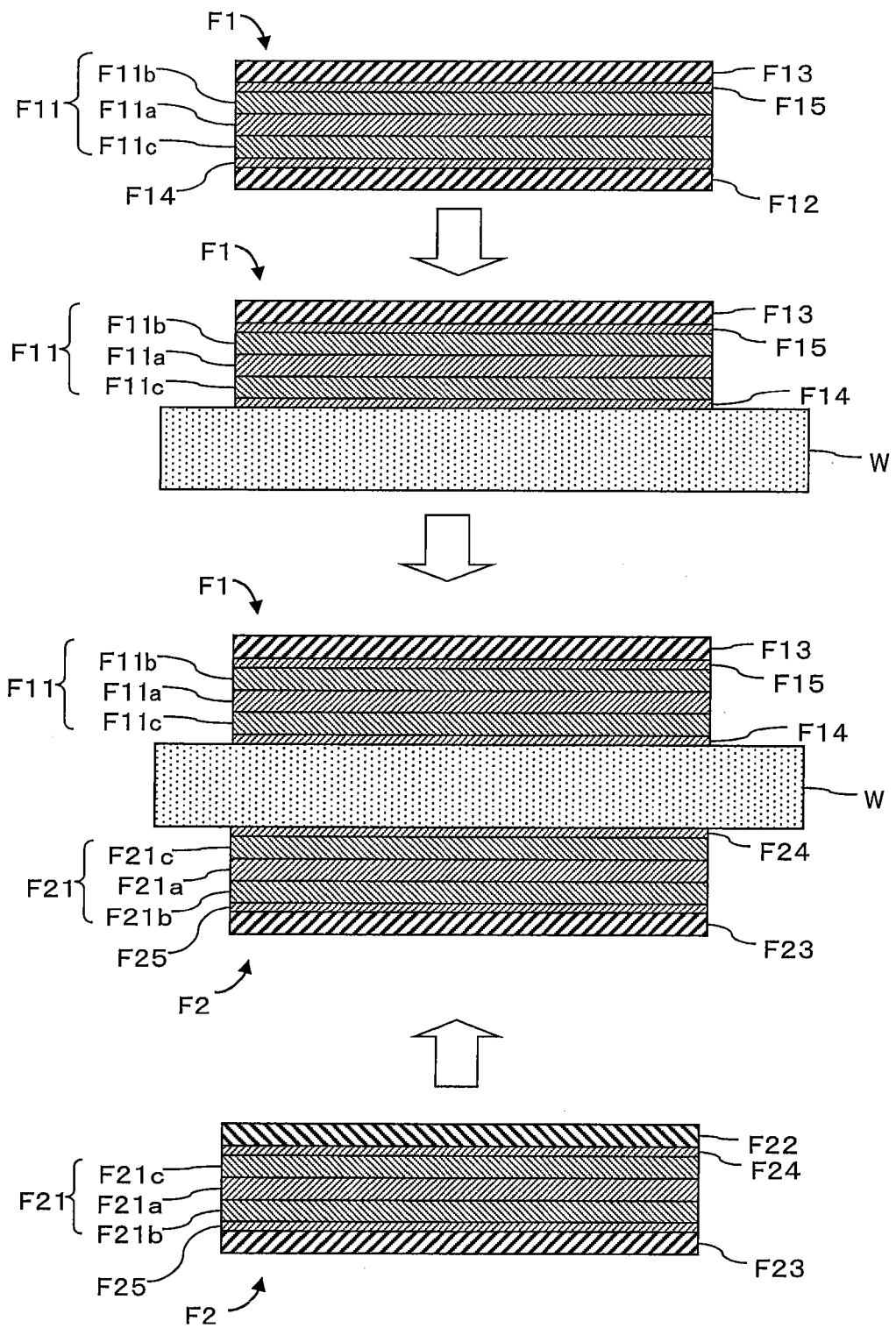
FIG. 2 is a view for explaining one example of a laminated structure of first and second optical films.

(1) First Material Roll Providing Step (S1 in FIG. 1). A long first sheet material is prepared as a first material roll. A width of the first material roll depends on a bonding size of the liquid crystal cell. As shown in FIG. 2, a lamination structure of a first sheet material F1 has a first optical film F11, a first release film F12 and a surface protecting film F13. The first optical film F11 is configured by a first polarizer F11a, a first film F11b provided on one surface via an adhesive layer (not shown), and a second film F11c provided on the other surface via the adhesive layer (not shown).

The first and second films F11b and F11c are configured, for example, by a polarizer protecting film (for example, a tri-acetyl cellulose film, a PET film or the like). The second film F11c is bonded to the liquid crystal cell surface side via a first pressure-sensitive adhesive layer F14. A surface treatment can be applied to the first film F11b. As the surface treatment, for example, there can be listed up a hard coating, an anti-reflection treatment, a treatment aiming at a prevention of a sticking, a diffusion and an anti-glare, and the like. The first release film F12 is provided via the second film F11c and the first pressure-sensitive adhesive layer F14. Further, the surface protecting film F13 is provided via the first film F11b and the pressure-sensitive adhesive layer F15. Specific constitutions of the first and second films F11b and F11c will be mentioned later. In the following description, the laminated structure of the polarizer and the polarizer protecting film may be referred to as a polarizing plate.

The phrase, "depending on the bonding size of the liquid crystal cell", which is used for the width of the first material roll or the width of the second material roll mentioned below, means matching with the size of either of the long side or short side of the liquid crystal cell. The matter "matching with the size of either of the long side or short side of the liquid crystal cell" means setting to the bonding length (the length except the exposure portion) of the optical film corresponding to the length of the long side or short side of the liquid crystal cell, and it is not necessary that the length of the long side or short side of the liquid crystal cell is identical to the width of the first material roll or the second material roll.

Each of the following steps is carried out within an isolating construction which is isolated in a factory, and a cleanliness factor is maintained. It is particularly preferable that the cleanliness factor is maintained in a bonding step bonding the optical film to the liquid crystal cell.

(2) Feeding Step (S2 in FIG. 1: First Feeding Step). The first sheet material F1 is fed from the provided and placed first material roll, and is fed to a downstream side.

(3) First Inspection Step (S3 in FIG. 1). A defect of the first sheet material F1 is inspected by using a first defect inspection apparatus. As a defect inspection method in this case, there can be listed up;

a method of imaging and image processing by using a transmitted light and a reflected light with respect to both surfaces of the first sheet material F1;

a method of imaging and image processing by arranging a polarization film for inspection between a CCD camera and a subject to be inspected, in such a manner as to form crossed nicols relation (which may be called as 0 degree cross) to a polarization axis (an optical axis) of the polarization plate in the subject to be inspected; and a method of imaging and image processing by arranging a polarization film for inspection between a CCD camera and a subject to be inspected, in such a manner as to form a predetermined angle (for example, in a range of larger than 0 degree and not more than 10 degree) (which may be called as x degree cross) to a polarization axis of the polarization plate in the subject to be inspected. In this case, a known method can be applied to an algorithm of the image processing, for example, the defect can be detected by grayscale determination in accordance with a binarization processing.

In the imaging and image processing method by the transmitted light, it is possible to detect a contaminant in an inner portion of the first sheet material F1. In the imaging and image processing method by the reflected light, it is possible to detect a contaminant attached to the front surface of the first sheet material F1. In the imaging and image processing method by the 0 degree cross, it is possible to mainly detect a contaminant on the front surface, a dirty, a contaminant in an inner portion and the like as a bright spot. In the imaging and image processing method by the x degree cross, it is possible to mainly detect a knick.

The information of the defect obtained by the first defect inspection apparatus is associated with its positional information (for example, a position coordinate), is transmitted to a controller, and can contribute to a cutting method by a first cutting apparatus mentioned below.

(4) First Cutting Step (S4 in FIG. 1: First Cutting Step). The first cutting apparatus cuts the surface protection film F13, the pressure-sensitive adhesive layer F15, the first optical film F11 and the first pressure-sensitive adhesive layer F14 to be a predetermined size without cutting the first release film F12. As the cutting means, for example, there can be listed up a laser apparatus, a cutter, and the other known cutting means. The constitution is made such as to include no defect within the region bonded to the liquid crystal cell W, and to cut while avoiding the defect, based on the information of the defect obtained by the first defect inspection apparatus. Accordingly, a yield ratio of the first sheet material F1 is widely improved. As mentioned above, a method for cutting the sheet material while avoiding the defect in such a manner that the defect is not included within the region bonded to the liquid crystal cell W is referred to as a skip cut, and the defect information at a time of cutting may be obtained by an inline defect inspection apparatus or may be previously attached to the material roll. The first sheet material F1 including the defect is excluded by a first rejection apparatus mentioned below, and is structured such as not to be bonded to a liquid crystal cell W.

It is preferable that these steps including the first material roll providing step, the first inspection step and the first cutting step are set as a continuous manufacturing line. In a series of manufacturing steps mentioned above, the first optical film F11 cut for bonding to one surface of the liquid crystal cell W is formed. A description will be given below of a step of forming the second optical film F21 which is cut for bonding to the other surface of the liquid crystal cell W. In this case, the steps of respectively forming the first optical film F11 and the second optical film F21 cut are made to be carried out in parallel.

(5) Second Material Roll Providing Step (S11 in FIG. 1). The long second sheet material F2 is provided as the second material roll. As shown in FIG. 2, a laminated structure of the second sheet material F2 is the same structure as the first sheet material, however, is not limited to this. The second sheet material F2 has the second optical film F21, a second release film F22, and a surface protecting film F23. The second optical film F21 is configured by a second polarizer 21a, a third film F21b provided on one surface thereof via an adhesive layer (not shown), and a fourth film F21c provided on the other surface thereof via an adhesive layer (not shown).

The third and fourth films F21b and F21c are configured, for example, by a polarizer protecting film (for example, a tri-acetyl cellulose film, a PET film or the like). The fourth film F21c is bonded to the liquid crystal cell surface side via a second pressure-sensitive adhesive layer F24. A surface treatment can be applied to the third film F21b. As the surface treatment, for example, there can be listed up a hard coat treatment, a reflection preventing treatment, a treatment aiming at a prevention of a sticking, a diffusion and an anti-glare, and the like. The second release film F22 is provided via the fourth film F21c and the second pressure-sensitive adhesive layer F24. Further, the surface protecting film F23 is provided via the third film F21b and the pressure-sensitive adhesive layer F25.

(6) Feeding Step (S12 in FIG. 1: Second Feeding Step). The second sheet material F2 is fed from the provided and placed second material roll, and is fed to a downstream side.

(7) Second Inspecting Step (S13 in FIG. 1). A defect of the second sheet material F2 is inspected by using a second defect inspection apparatus. The defect inspecting method in this case is the same as the method by the first defect inspection apparatus mentioned above.

(8) Second Cutting Step (S14 in FIG. 1: Second Cutting Step). A second cutting apparatus cuts the surface protecting film F23, the pressure-sensitive adhesive layer F25, the second optical film F21 and the second pressure-sensitive adhesive layer F24 to be a predetermined size without cutting the second release film F22. As the cutting means, for example, there can be listed up a laser apparatus, a cutter, the other known cutting means and the like. The constitution is made such as to include no defect within the region bonded to the liquid crystal cell W, and to cut while avoiding the defect, based on the information of the defect obtained by the second defect inspection apparatus. Accordingly, a yield of the second sheet material F2 is widely improved. The second sheet material F2 including the defect is excluded by a second rejection apparatus mentioned below, and is structured such as not to be bonded to the liquid crystal cell W.

A step of feeding the liquid crystal cell W is carried out in parallel to the steps of respectively forming the first optical film F11 and the second optical film F21 cut as mentioned above. The following process is applied to the liquid crystal cell W during its feeding.

(9) Cleaning Step (S6 in FIG. 1). The liquid crystal cell W is cleaned for its surface in accordance with a polishing cleaning, a water cleaning or the like.

(10) Liquid Crystal Cell Positioning Step (S5 in FIG. 1). The liquid crystal cell W is positioned by a panel positioning apparatus in such a manner as to be fed at a predetermined position.

In the present embodiment, the first optical film F11 and the second optical film F21 respectively cut are bonded to both the surfaces of the liquid crystal cell W which is fed as mentioned above, in accordance with the aspect mentioned below.

(11) Optical Film Positioning Step (S15 in FIG. 1: Film Positioning Step). The first optical film F11 is positioned by a first film positioning apparatus, and the second optical film F21 is positioned by a second film positioning apparatus, respectively in such a manner as to be fed at their predetermined positions. In accordance with this step, relative positioning between the first optical film F11 and the second optical film F21 is achieved. In this case, the optical film positioning step is not limited to the constitution which is carried out after the first cutting step and the second cutting step, but may be the constitution such as to be carried out before or in parallel to the first cutting step and the second cutting step.

(12) Optical Film Bonding Step (S16 in FIG. 1: First Bonding Step and Second Bonding Step). The first optical film F11 cut is bonded to one surface of the liquid crystal cell W through the first pressure-sensitive adhesive layer F14 interposed therebetween by a first bonding apparatus, after the first release film F12 is removed by a first peeling apparatus (a first bonding step). Further, the second optical film F21 cut is bonded to the other surface of the liquid crystal cell W through the second pressure-sensitive adhesive layer F24 interposed therebetween by a second bonding apparatus, after a second release film F22 is removed by a second peeling apparatus (a second bonding step). In other words, the bonding step including the first bonding step and the second bonding step is executed by the bonding apparatus including the first bonding apparatus and the second bonding apparatus. Accordingly, the optical films F11 and F21 are bonded to both the surfaces of the liquid crystal cell W.

(13) Inspecting Step of Optical Display Device (S17 in FIG. 1). The inspecting apparatus detects the optical display device in which the optical film is bonded to both the surfaces of the liquid crystal cell W. As an inspecting method, there can be exemplified a method of imaging and image processing by using the reflected light with respect to both the surfaces of the optical display device. Further, as the other method, there can be listed up a method of using the polarization film for inspecting placed between the CCD camera and the subject to be inspected. In this case, a known method can be applied to an algorithm of the image processing, and it is possible to detect the defect, for example, by grayscale determination in accordance with a binarization processing.

(14) A non-defective of the optical display device is determined based on the information of the defect obtained by the inspecting apparatus. The optical display device determined as the non-defective is fed to the next mounting process. In the case that a defective is determined, a reworking process is applied, and the optical film is bonded newly, and is next inspected. In the case that the non-defective is determined, the process gives way to the mounting process, and in the case that the defective is determined, the process again gives way to the reworking process or the defective is put on the shelf.

In a series of manufacturing steps mentioned above, it is possible to suitably produce the optical display device by setting the bonding step of the first optical film F11 and the bonding step of the second optical film F21 to the continuous manufacturing line.

(Other Embodiment of Skip Cut)

Further, a description will be given below of the other embodiments of the first cutting step and the second cutting step. There is a case that the defect information (the defect coordinate, the kind of the defect, the size or the like) of the first and second sheet materials is attached as a code information (for example, a QR code and a bar code) to one end portion in a width direction of the first and second material rolls at a predetermined pitch unit (for example, 1000 mm). In the case mentioned above, the step reads the cord information in a preliminary stage of the cutting, and cuts into a predetermined size in the first and second cutting steps in such a manner as to avoid the defect portion based on the analysis. Further, a constitution is made in such manner that the portion including the defect is removed or bonded to the other member than the liquid crystal cell, and the piece of sheet material which is cut into the predetermined size and is determined as the non-defective is bonded to the liquid crystal cell. Accordingly, a yield of the optical films F11 and F21 is widely improved.

(Preferable Manufacturing System Achieving Manufacturing Methods of First Embodiment)

A description will be given below of an example of a preferable manufacturing system which achieves the manufacturing method in accordance with the first embodiment.

Various apparatuses achieving the manufacturing method in accordance with the first embodiment are isolated from an external portion by the isolating construction. An internal portion surrounded by the isolating construction is kept clean in comparison with the external portion. The isolating construction is configured by a transparent material wall and a frame construction. A blower apparatus is installed in a ceiling of the isolating construction. The blower apparatus is provided with a HEPA filter, and sends air having a high cleanliness to the internal portion of the partition wall construction. A lower portion of a wall surface of the partition wall construction is provided with an air discharge opening portion for discharging the internal air to the external portion. Further, a filter may be provided in an opening surface for preventing an intruding material from the external portion. It is possible to maintain a whole of the manufacturing system in a clean environment by the partition wall construction and the blower apparatus, and it is possible to preferably prevent the contaminant from being mixed from the external portion. Further, since only the manufacturing system is isolated from the external portion by the partition wall construction, it is not necessary to set a whole of factory to a so-called clean room.

First, a description will be given for a polishing cleaning apparatus. The liquid crystal cell W is taken out from the storage box, and is mounted to the feeding mechanism. If the liquid crystal cell W reaches a cleaning position, the feed is stopped, and an end portion of the liquid crystal cell W is held by holding means. Grinding means are brought into contact with a top surface of the liquid crystal cell W from the vertical above, and another grinding means are brought into contact with a lower surface of the liquid crystal cell from the vertical below. The grinding means are rotated on both the surfaces of the liquid crystal cell W. Accordingly, the attached contaminants on both the surfaces of the liquid crystal cell W are removed. As the attached contaminant, for example, a micro piece of a glass, a fiber piece and the like are exemplified.

Next, a description will be given for a water cleaning apparatus. The grind cleaned liquid crystal cell W is fed to a water bath by the feeding mechanism, and is water cleaned here. A pure water flows in an inner portion of the water bath. Both surfaces of the liquid crystal cell W fed from the water bath are cleaned by the pure water flown out of a flowing water pipe. Next, the liquid crystal cell W is drained by a ventilation of the clean air by means of a drying apparatus. In this case, as the other embodiment, it is possible to clean by using an ethanol aqueous solution in place of the pure water. Further, as the other embodiment, it is possible to omit the water bath.

Figure 3:
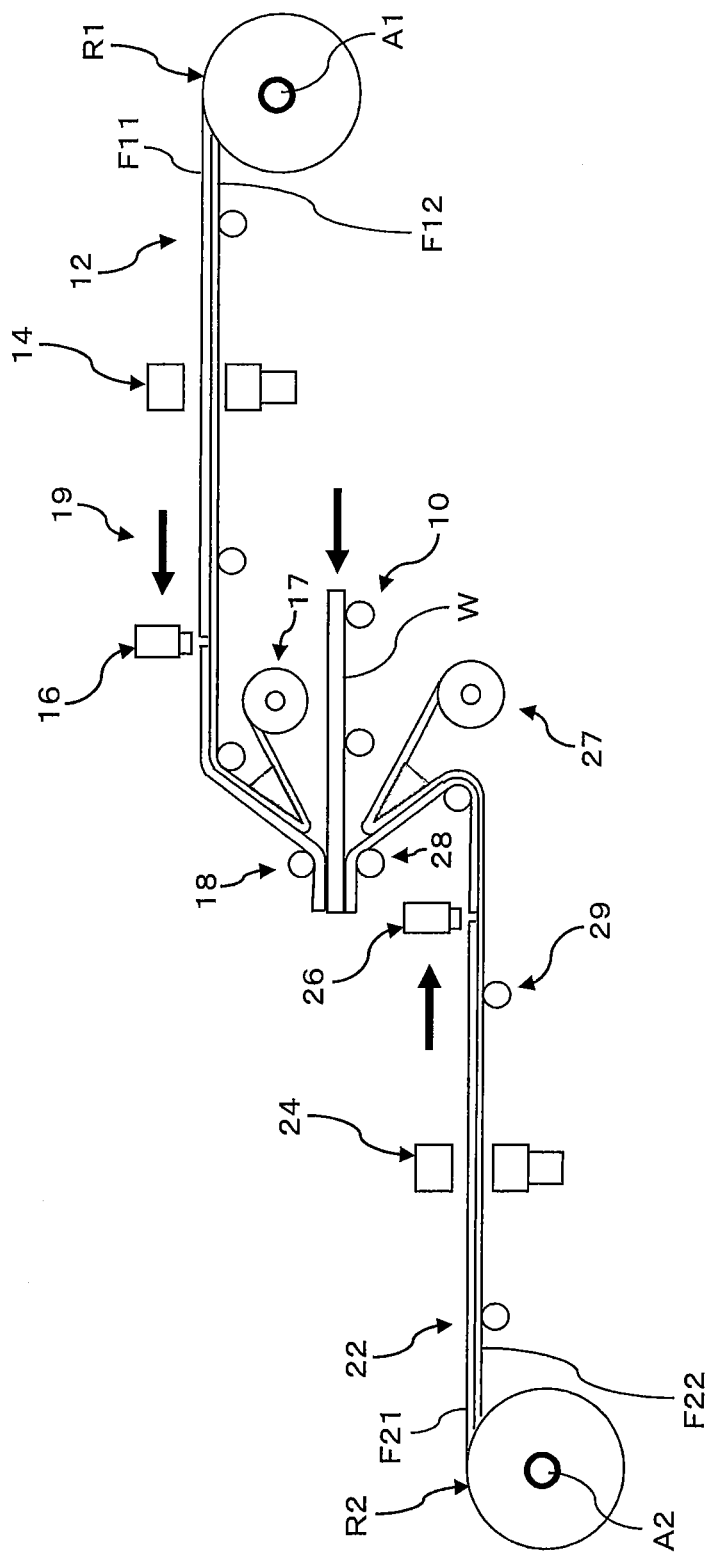
FIG. 3 is a schematic view showing one constitution example for bonding an optical film to a liquid crystal cell.

FIG. 3 is a schematic view showing one constitution example for bonding the optical films F11 and F21 to the liquid crystal cell W. A description will be sequentially given below of various apparatuses appropriately with reference to FIG. 3.

The liquid crystal cell W cleaned as mentioned above is positioned by a panel positioning apparatus 10 in a process of being fed, and the optical films F11 and F21 are thereafter bonded to both surfaces thereof. The panel positioning apparatus 10 is provided, for example, with one or a plurality of rollers for feeding the liquid crystal cell W, and an edge detection portion for detecting an edge of the liquid crystal cell W. The panel positioning apparatus 10 makes the liquid crystal cell W meander by inclining the roller based on a result of detection of the edge of the liquid crystal cell W by the edge detection portion, and positions in such a manner that the liquid crystal cell W is fed at a predetermined position.

The first material roll R1 of the long first sheet material F1 is installed to a roll mount apparatus working with a motor or the like in such a manner as to rotate free or rotate at a fixed rotating speed. The rotating speed is set by a controller and is drive-controlled.

The first feeder 12 is a feeding mechanism feeding the first sheet material F1 to a downward side. The first feeder 12 is provided with a lot of feed rollers, and the first sheet material F1 is fed along a feed path formed by the feed rollers. The feed path extends from the first material roll R1 to the first bonding apparatus 18. The first feeder 12 is controlled by the controller.

The first inspecting apparatus 14 inspects the defect after peeling off the first release film F12. The first inspecting apparatus 14 analyzes an image data photographed by a CCD camera so as to detect the defect, and calculates a position coordinate thereof. The position coordinate of this defect is provided for the skip cut by the first cutting apparatus 16 mentioned below.

The first cutting apparatus 16 cuts the first optical film F11 which is fed by the first feeder 12, and in this example, the apparatus 16 cuts the first optical film F11, the surface protecting film F13, the first pressure-sensitive adhesive layer F14 and the pressure-sensitive adhesive layer F15 into a predetermined size without cutting the first release film F12. The first cutting apparatus 16 is, for example, a laser apparatus. Based on the position coordinate of the defect which is detected by the first defect inspection process, the first cutting apparatus 16 cuts them into a predetermined size while avoiding the defect portion, in such a manner that the defect is not included within the region which is bonded to the liquid crystal cell W. In other words, the cut piece including the defect portion is excluded as the defective by the first rejection apparatus in the later step. Alternatively, the first cutting apparatus 16 may continuously cut into the predetermined size without respect to the existence of the defect. In this case, the structure may be made such as to remove the portion without bonding, in a bonding step mentioned below. The control in this case is based on the function of the controller.

A first film positioning apparatus 19 carries out positioning of the first optical film F11. The first film positioning apparatus 19 is provided, for example, with one or a plurality of rollers for feeding the first optical film F11, and an edge detection portion for detecting an edge of the first optical film F11 cut. The first film positioning apparatus 19 makes the first optical film F11 meander by inclining the roller based on a result of detection of the first optical film F11 by the edge detection portion, and positions in such a manner that the first optical film F11 is fed at a predetermined position.

In order to well carry out the positioning of the first optical film F11, it is preferable that the edge detection portion detects the edge in a tip of the first optical film F11, and it is preferable that the roller makes the first optical film F11 meander in front side to some extent from the tip of the first optical film F11. Accordingly, it is preferable that the edge detection portion is provided at the back of the first cutting apparatus 16, and the roller is provided in front of the first cutting apparatus 16.

The first bonding apparatus 18 bonds the first sheet material F1 (the first optical film F11), which is cut by the first cutting apparatus 16 and from which the first release film F12 is peeled by the first peeling apparatus 17, to one surface (an upper surface in this example) of the liquid crystal cell W through the first pressure-sensitive adhesive layer F14 interposed therebetween. In the case of bonding, the first optical film F11 is bonded to the liquid crystal cell W surface while pressure contacting a pressing roller and a guide roller. A pressing pressure and a driving motion of the pressing roller and the guide roller are controlled by the controller.

The peeling mechanism of the first peeling apparatus 17 is structured such as to peel off the first release film F12 by reverse transferring the first release film F12, and to feed the first sheet material F1 (the first optical film F11) after peeling off the first release film F12 to the liquid crystal cell W surface. At this time, it is possible to improve a bonding precision of the first optical film F11 by carrying out a state in which a tensile force, which is equal to or more than 150 N/m and equal to or less than 1000 N/m, is applied to the first release film F12 and/or by carrying out a time within three seconds until the first optical film F11 is pressure contacted with the liquid crystal cell W surface after the first release film F12 is peeled off. If the tensile force is smaller than 150 N/m, a feeding position of the first optical film F11 is not stable, and if it is larger than 1000 N/m, there is a risk that the first release film F12 extends so as to be broken. If the time until the pressure contact is longer than three seconds, there is a risk that the first optical film F11 peeled off from the first release film F12 is curved and a bending or an air bubble is generated. The peeled first release film F12 is wound around the roll. A winding control of the roll is controlled by the controller.

The bonding mechanism is configured by the pressing roller and the guide roller arranged so as to oppose thereto. The guide roller is configured by a rubber roller which is rotationally driven by a motor, and is arranged so as to be movable up and down. Further, the pressing roller configured by a metal roller which is rotationally driven by a motor is arranged just above the same so as to be movable up and down. The pressing roller is structured such as to be moved up to a higher position than a top surface thereof so as to form a roller interval at a time of feeding the liquid crystal cell W to the bonding position. In this case, each of the guide roller and the pressing roller may be configured by the rubber roller or the metal roller. The liquid crystal cell W is cleaned by the various cleaning apparatuses as mentioned above, and is structured such as to be fed by the feeding mechanism. The feed control of the feeding mechanism is also controlled by the controller.

A description will be given for a first rejection apparatus rejecting the first sheet material F1 including the defect, which is not illustrated in FIG. 3. If the first sheet material F1 including the defect is fed to the bonding position, the guide roller moves downward vertically. Next, the roller around which a remover film is wound moves to a fixed position of the guide roller. The first sheet material F1 including the defect is pressed to the remover film by moving the pressing roller downward vertically, the first sheet material F1 is bonded to the remover film, and the first sheet material F1 including the defect is wound around the roller together with the remover film. The remover film can stick the first sheet material F1 including the defect by utilizing adhesive power of the first pressure-sensitive adhesive layer F14, however, a pressure sensitive adhesive tape can be used as the remover film.

In the same manner as described above, the second optical film F21 (the second sheet material F2) is bonded to the other surface of the liquid crystal cell W in which the first optical film F11 is thus bonded to the one surface. In the following description, a similar apparatus structure will be briefly described.

The second material roll R2 of the long second sheet material F2 is installed to the roll mount apparatus working with the motor or the like in such a manner as to rotate free or rotate at a fixed rotating speed. The rotating speed is set by the controller, and is drive-controlled.

The second feeder 22 is a feeding mechanism feeding the second sheet material F2 to a downward side. The second feeder 22 is provided with a lot of feed rollers, and the second sheet material F2 is fed along a feed path formed by these feed rollers. The feed path extends from the second material roll R2 to the second bonding apparatus 28. The second feeder 22 is controlled by a controller, and a feed speed thereof is set to the same as that of the first feeder 12.

The second inspecting apparatus 24 inspects the defect after peeling off the second release film F22. The second inspecting apparatus 24 analyzes an image data photographed by a CCD camera so as to detect the defect, and calculates a position coordinate thereof. The position coordinate of this defect is provided for the skip cut by the second cutting apparatus 26 mentioned below.

The second cutting apparatus 26 cuts the second optical film F21 which is fed by the second feeder 22, and in this example, the apparatus 26 cuts the second optical film F21, the surface protecting film F23, the second pressure-sensitive adhesive layer F24 and the pressure-sensitive adhesive layer F25 into a predetermined size without cutting the second release film F22. The second cutting apparatus 26 is, for example, a laser apparatus. Based on the position coordinate of the defect which is detected by the second defect inspection process, the second cutting apparatus 26 cuts them into a predetermined size while avoiding the defect portion, in such a manner that the defect is not included within the region which is bonded to the liquid crystal cell W. In other words, the cut piece including the defect portion is excluded as the defective by the second rejection apparatus in the later step. Alternatively, the second cutting apparatus 26 may continuously cut into the predetermined size without respect to the existence of the defect. In this case, the structure may be made such as to remove the portion without bonding, in a bonding step mentioned below. The control in this case is based on the function of the controller.

A second film positioning apparatus 29 carries out positioning of the second optical film F21. The second film positioning apparatus 29 is provided, for example, with one or a plurality of rollers for feeding the second optical film F21, and an edge detection portion for detecting an edge of the second optical film F21 cut. The second film positioning apparatus 29 makes the second optical film F21 meander by inclining the roller based on a result of detection of the second optical film F21 by the edge detection portion, and positions in such a manner that the second optical film F21 is fed at a predetermined position.

In order to well carry out the positioning of the second optical film F21, it is preferable that the edge detection portion detects the edge in a tip of the second optical film F21, and it is preferable that the roller makes the second optical film F21 meander in front side to some extent from the tip of the second optical film F21. Accordingly, it is preferable that the edge detection portion is provided at the back of the second cutting apparatus 26, and the roller is provided in front of the second cutting apparatus 26.

The second bonding apparatus 28 bonds the second sheet material F2 (the second optical film F21), which is cut by the second cutting apparatus 26 and from which the second release film F22 is peeled by the second peeling apparatus 27, to the other surface (an lower surface in this example) of the liquid crystal cell W through the second pressure-sensitive adhesive layer F24 interposed therebetween. In the case of bonding, the second optical film F21 is bonded to the liquid crystal cell W surface while pressure contacting by a pressing roller and a guide roller. A pressing pressure and a driving motion of the pressing roller and the guide roller are controlled by the controller.

The peeling mechanism of the second peeling apparatus 27 is structured such as to peel off the second release film F22 by reverse transferring the second release film F22, and to feed the second sheet material F2 (the second optical film F21) after peeling off the second release film F22 to the liquid crystal cell W surface. At this time, it is possible to improve a bonding precision of the second optical film F21 by carrying out a state in which a tensile force which is equal to or more than 150 N/m and equal to or less than 1000 N/m is applied to the second release film F22 and/or by carrying out a time within three seconds until the second optical film F21 is pressure contacted with the liquid crystal cell W surface after the second release film F22 is peeled off. If the tensile force is smaller than 150 N/m, a feeding position of the second optical film F21 is not stable, and if it is larger than 1000 N/m, there is a risk that the second release film F22 extends so as to be broken. If the time until the pressure contact is longer than three seconds, there is a risk that the second optical film F21 peeled off from the second release film F22 is curved and a bending or an air bubble is generated. The peeled second release film F22 is wound around the roll. A winding control of the roll is controlled by the controller.

The bonding mechanism is configured by the pressing roller and the guide roller arranged so as to oppose thereto. The guide roller is configured by a rubber roller which is rotationally driven by a motor, and is arranged so as to be movable up and down. Further, the pressing roller configured by a metal roller which is rotationally driven by a motor is arranged just below the same so as to be movable up and down. The pressing roller is structured such as to be moved down to a below position so as to form a roller interval at a time of feeding the liquid crystal cell W to the bonding position. In this case, each of the guide roller and the pressing roller may be configured by the rubber roller or the metal roller.

A description will be given for a second rejection apparatus rejecting the second sheet material F2 including the defect, which is not illustrated in FIG. 3. If the second sheet material F2 including the defect is fed to the bonding position, the guide roller moves upward vertically. Next, the roller around which a remover film is wound moves to a fixed position of the guide roller. The second sheet material F2 including the defect is pressed to the remover film by moving the pressing roller upward vertically, the second sheet material F2 is bonded to the remover film, and the second sheet material F2 including the defect is wound around the roller together with the remover film.

The optical display device formed by bonding the first and second sheet materials to the liquid crystal cell W is fed to the inspecting apparatus. The inspecting apparatus executes the inspection with respect to both surfaces of the fed optical display device. The light source emits light vertically to the top surface of the optical display device by a half mirror, and a reflected light image is photographed as an image data by a CCD camera. Further, the other light source emits light to the front surface of the optical display device at a predetermined angle, and a reflected light image is photographed as an image data by the CCD camera. The inspection of the opposite surface of the optical display device is executed in the same manner by using the light source and the CCD camera. The defect is image processed and analyzed from the image data, and a non-defective is determined.

An operation timing of each of the apparatuses is calculated, for example, by a method that a sensor is arranged at a predetermined position so as to detect, or is calculated in such a manner as to detect a rotating member of the feeder and the feeding mechanism by a rotary encoder or the like. The controller may be achieved by a cooperating action between a software program and a hardware resource such as a CPU, a memory or the like. In this case, the program software, a processing procedure, various settings and the like are previously stored in the memory. Further, it can be configured by a dedicated circuit, a firmware or the like.

In the present embodiment, the first film positioning apparatus 19 and the second film positioning apparatus 29 constitute a film positioning apparatus carrying out relative positioning of the first optical film F11 and the second optical film F21. In this example, the respective tips of the first optical film F11 and second optical film F21 cut are positioned in such a manner as to be simultaneously led to the same position in a plan view, whereby the first optical film F11 and the second optical film F21 are simultaneously bonded to the liquid crystal cell W.

However, as far as a period for which the first bonding apparatus 18 bonds the first optical film F11 to one surface of the liquid crystal cell W and a period for which the second bonding apparatus 28 bonds the second optical film F21 to the other surface of the liquid crystal cell W overlap at least partly, the constitution is not limited to the constitution in which they are simultaneously bonded as mentioned above. In accordance with the constitution in which the respective periods overlap partly, it is possible to bond the first optical film F11 and the second optical film F21 to both the surfaces of the liquid crystal cell W in parallel at least for a fixed period. Accordingly, since it is possible to simultaneously or continuously bond the first optical film F11 and the second optical film F21 in a state in which the positioning of the liquid crystal cell W is carried out, it is not necessary to position the liquid crystal cell W at a time of bonding each of them, such as a case where the first optical film F11 and the second optical film F21 are separately bonded. Accordingly, it is possible to cut down the positioning apparatus, and it is possible to bond the optical films F11 and F21 to both the surfaces of the liquid crystal cell W in good condition with a simpler constitution. In this case, the constitution can be made such that the respective periods do not overlap, without being limited to the constitution in which the respective periods partly overlap.

(Other Embodiment of Manufacturing System)

A known defect inspecting method can be applied to the defect inspection. An automatic inspecting apparatus is an apparatus which automatically inspects a defect (which may be also called as a blemish) of the sheet material, and is structured such as to emit a light, acquire a reflected light image or a transmitted light image via an imaging portion such as a line sensor, a two-dimensional TV camera or the like, and carry out a defect detection based on the acquired image data. Further, the image data is acquired in a state in which a polarizing filter for inspection is interposed in a light path between a light source and an imaging portion. Generally, a polarization axis (for example, a polarization absorption axis) of the polarizing filter for inspection is arranged in such a manner as to come to a state (crossed nicols relation) being orthogonal to a polarization axis (for example, a polarization absorption axis) of the polarizing plate to be inspected. Based on the arrangement in the crossed nicols, a whole area black image is input from the imaging portion if the defect does not exist, however, if the defect exists, the corresponding portion does not come to black (is recognized as a bright spot). Accordingly, it is possible to detect the defect by setting an appropriate threshold value. In the bright spot detection as mentioned above, the defect such as the surface attached material, the internal contaminant is detected as the bright spot. Further, in addition to the bright spot detection, there is a method of detecting the contaminant by CCD imaging the transmitted image with respect to the subject so as to analyze the image. Further, there is a method of detecting the surface attached contaminant by CCD imaging the reflected light image with respect to the subject so as to analyze the image.

The description is given for the method (the half cut method) of cutting the other members of the sheet material without cutting the release film, in the cutting step mentioned above. In accordance with the structure mentioned above, it is possible to cut the optical film and the pressure-sensitive adhesive layer without cutting the release film laminated to the optical film via the pressure-sensitive adhesive layer, and peel off the release film from the optical film before the bonding step applied to the liquid crystal cell. In other words, since the structure can be made such that the pressure-sensitive adhesive layer corresponding to the bonding surface of the optical film is not exposed until just before the bonding, it is possible to prevent the contaminant from being mixed into the bonding surface of the optical film.

Particularly, it is possible to feed the cut optical film and pressure-sensitive adhesive layer while using the release film as the carrier, by cutting the optical film and the pressure-sensitive adhesive layer without cutting the release film. Accordingly, since the feeder of the optical film can be made as a simpler structure, it is possible to further reduce the manufacturing cost of the optical display device.

Figure 4:
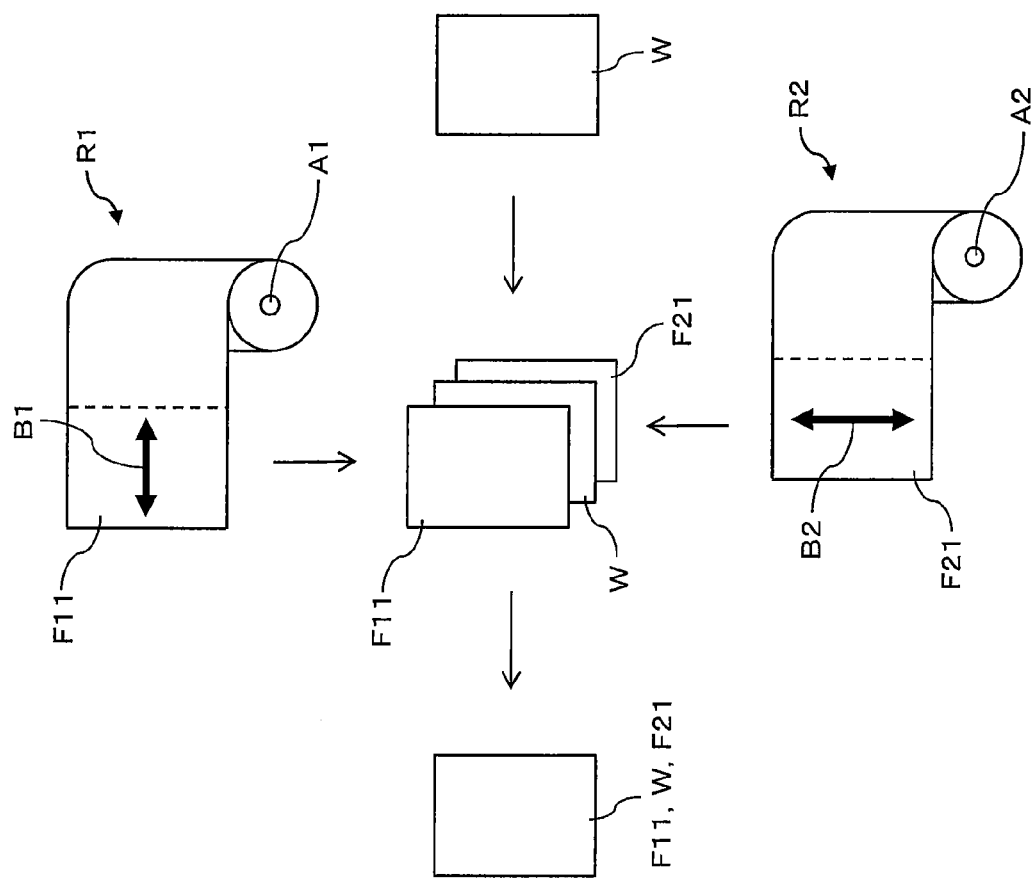
FIG. 4 is a schematic view for explaining an aspect of bonding the optical film to the liquid crystal cell.
Figure 5:
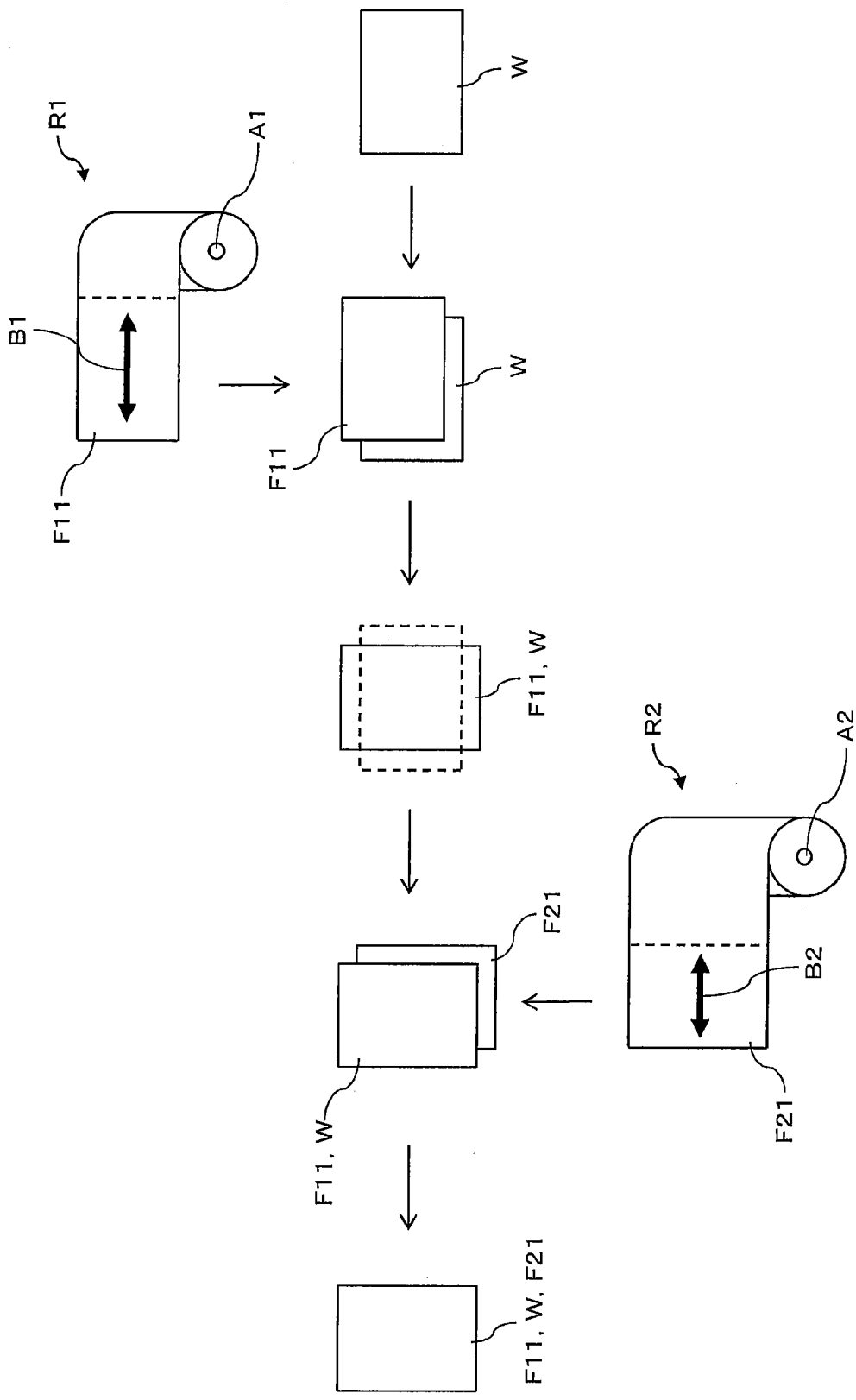
FIG. 5 is a schematic view showing an example of a conceivable aspect of bonding the optical film to the liquid crystal cell.
Figure 6:
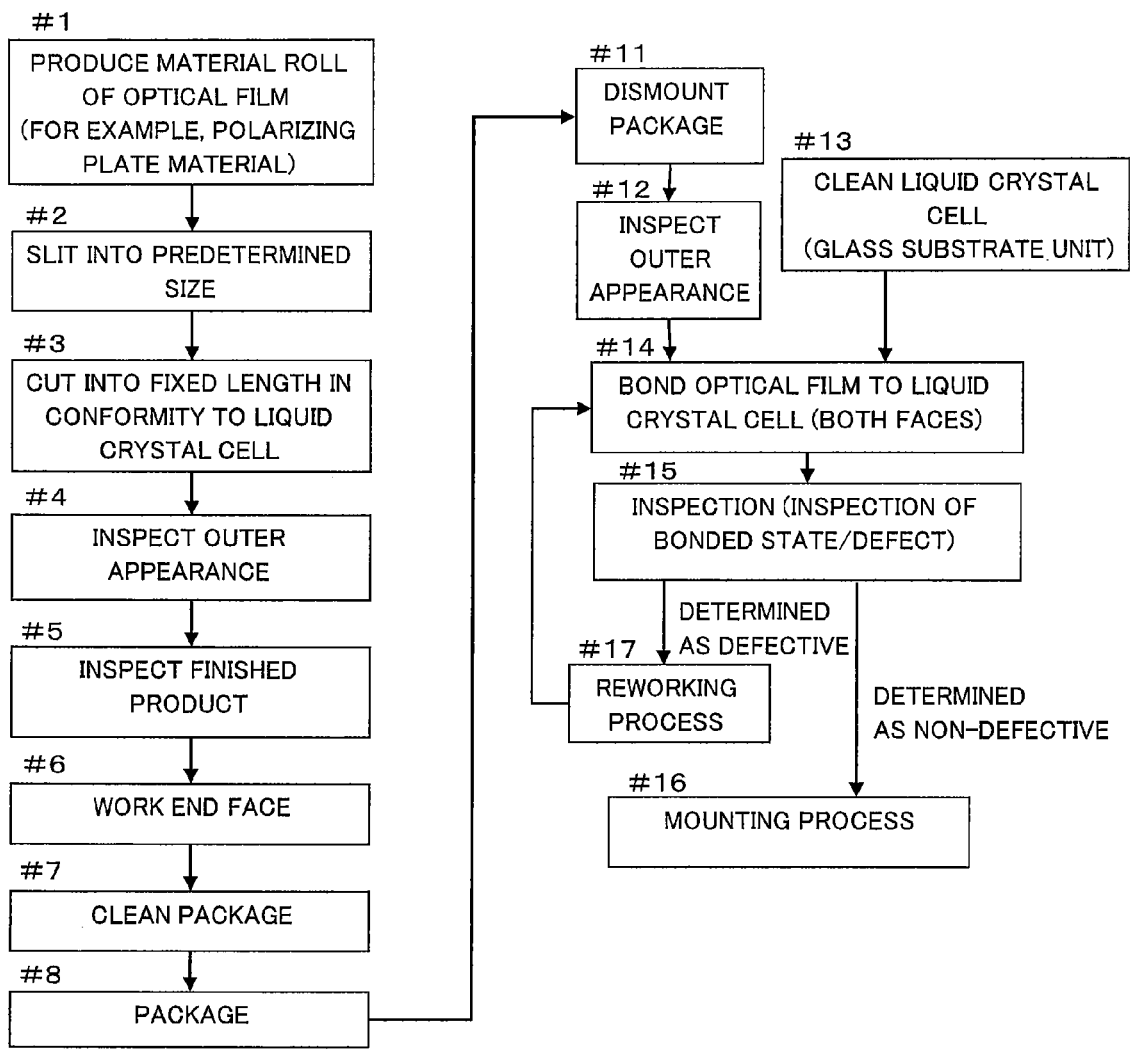
FIG. 6 is a flow chart of a conventional method for manufacturing an optical display device.

FIG. 4 is a schematic view for explaining an aspect of bonding the optical films F11 and F21 with respect to the liquid crystal cell W. Each of the first optical film F11 and the second optical film F21 is comprised of a stretched film stretched in such a manner that it can allow to pass only lights oscillating along the polarization axes B1 and B2.

The first material roll R1 is formed by winding the first optical film F11 (the first sheet material F1) in such a manner that the polarization axis B1 extends in an orthogonal direction to a width direction along the core A1. A width of the first optical film F11 along the core A1 of the first material roll R1 is a length corresponding to the long side of the liquid crystal cell W. The first feeder 12 feeds the first optical film F11 in an orthogonal direction with respect to the width direction from the first material roll R1. Further, the first optical film F11 fed is cut in the width direction at an interval corresponding to the short side of the liquid crystal cell W, whereby the first optical film F11 cut in a rectangular shape corresponding to the liquid crystal cell W is formed.

On the other hand, the second material roll R2 is formed by winding the second optical film F21 (the second sheet material F2) in such a manner that the polarization axis B2 extends in a parallel direction with respect to the width direction along the core A2, that is, in an orthogonal direction with respect to the polarization axis B1 of the first optical film F11. A width of the second optical film F21 along the core A2 of the second material roll R2 is identical to the width of the first optical film F11, and is a length corresponding to the long side of the liquid crystal cell W. The first material roll R1 and the second material roll R2 are arranged in such a manner that the cores A1 and A2 are in parallel to each other. The second feeder 22 feeds the second optical film F21 in an orthogonal direction with respect to the width direction from the second material roll R2. Further, the second optical film F21 fed is cut in the width direction at an interval corresponding to the short side of the liquid crystal cell W, whereby the second optical film F21 cut in a rectangular shape corresponding to the liquid crystal cell W is formed.

The first optical film F11 and the second optical film F21 respectively cut as mentioned above are bonded respectively to both the surfaces of the liquid crystal cell W in such a manner that the long sides and short sides thereof correspond to the long side and the short side of the liquid crystal cell W. Accordingly, the first optical film F11 and the second optical film F21 are bonded to both the surfaces of the liquid crystal cell W in such a manner that the respective polarization axes B1 and B2 are orthogonal to each other. Therefore, since it is possible to set the first optical film F11 and the second optical film F21, which are bonded respectively to both the surfaces of the liquid crystal cell W, to the crossed nicols relation, without the provision of the mechanism for rotating the liquid crystal cell W or the like, it is possible to bond the optical films F11 and F21 to both the surfaces of the liquid crystal cell W in good condition with a simpler constitution.

Particularly, since the first optical film F11 is wound in such a manner that the polarization axis B1 extends in the orthogonal direction with respect to the width direction, and the second optical film F21 is wound in such a manner that the polarization axis B2 extends in the width direction, it is easy to position the polarization axes B1 and B2 of the optical films F11 and F21 to the long side or short side of the liquid crystal cell W. Accordingly, since there is a low possibility that the polarization axes B1 and B2 are deviated at a time of bonding the optical films F11 and F21 to the liquid crystal cell W, and the contrast abnormality of the optical display device caused by the deviation of the polarization axes B1 and B2 is hardly generated, it is possible to bond the optical films F11 and F21 to both the surfaces of the liquid crystal cell W in good condition.

Further, in the present embodiment, it is possible to set the first optical film F11 and the second optical film F21 to the crossed nicols relation by cutting each of the first optical film F11 and the second optical film F21 respectively at the interval corresponding to the short side of the liquid crystal cell W, and bonding each of the optical films F11 and F21 cut to both the surfaces of the liquid crystal cell W. Accordingly, since it is possible to make a time for feeding the first optical film F11 from the first material roll R1 for obtaining a cut piece of the first optical film F11, and a time for feeding the second optical film F21 from the second material roll R2 for obtaining a cut piece of the second optical film F21 shorter than that of the case of cutting the film at the interval corresponding to the long side of the liquid crystal cell W, it is possible to efficiently bond the optical films F11 and F21 to both the surfaces of the liquid crystal cell W.

The optical display device manufactured in accordance with the aspect such as the present embodiment is mounted to an image display device such as a liquid crystal display device or the like, and is viewed from one surface of back and front surfaces. However, it is preferable that the first optical film F11 is bonded to a surface to be a front side (a visible side) at a time of viewing the optical display device, and the second optical film F21 is bonded to a surface to be a back side (a backlight side) at a time of viewing the optical display device, with respect to the liquid crystal cell W.

Reference Example 1

Preparation of polarization plate A: A polyvinyl alcohol film having a polymerization degree of 2700 and a thickness of 75 μm was fed from a material roll, stretched 1.2 folds in a feeding direction while being swollen for one minute in a water bath at 30° C., thereafter dipped in an aqueous solution having a potassium iodide concentration of 0.03% and an iodine concentration of 0.3% at 30° C. for 60 minutes so as to be dyed, and stretched 3 folds totally in a film feeding direction. Next, it was stretched totally 6 folds while being dipped in an aqueous solution having a boric acid concentration of 4% and a potassium iodide concentration of 5% at 60° C. for 30 seconds. Finally, it was cleaned by being dipped in an aqueous solution having a potassium iodide concentration of 2% at 30° C. for several seconds, and a polarizer was obtained by drying the obtained stretched film at 70° C. for 2 minutes. A polarizing plate A having a polarization axis (an absorption axis) in an orthogonal direction with respect to a width direction was prepared by bonding "TD80UL manufactured by Fujifilm Corporation" serving as a polarizer protecting film to both surfaces of the obtained polarizer through a PVA adhesive agent interposed therebetween. The optical characteristics of the obtained polarizing plate A were measured by "Spectrophotometer V7100 manufactured by JASCO Corporation", the transmittance was 41.0% and the polarization degree was 99.997%.

Preparation of polarization plate B: A polyvinyl alcohol film having a polymerization degree of 2400 and a thickness of 75 μm was fed from a material roll, both ends in the width direction of the PVA film were gripped by gripping means, and the PVA film was fed in a longitudinal direction at a speed of 1 m/min by a tenter stretching machine. Water (swelling water) at 30° C. was sprayed to both the surfaces of the PVA film under a vapor phase for 30 seconds, at a flow rate of 16 mL/min, by using a spraying apparatus which was reciprocated in the width direction of the PVA film at 30 m/min. At this time, the PVA film was stretched in the width direction so as to be 2.2 folds in length of the material roll by the gripping means. An aqueous solution (a dyeing solution) including 0.2% by weight of iodine at 30° C. was sprayed to one surface of the PVA film after being swollen under a vapor phase for 25 seconds by using the spraying apparatus. At this time, the PVA film was stretched in the width direction so as to be 3.3 folds in length of the material roll by the gripping means. An aqueous solution (a cross-linking solution) including 3% by weight of boric acid and 3% by weight of potassium iodide at 30° C. was sprayed to one surface of the PVA film after the dyeing process under a vapor phase for 10 seconds by using the spraying apparatus. At this time, the PVA film was stretched in the width direction so as to be 3.6 folds in length of the material roll by the gripping means. An aqueous solution (a stretching solution) including 4% by weight of boric acid and 5% by weight of potassium iodide at 60° C. was sprayed to one surface of the PVA film after cross-linking for 60 seconds by using the spraying apparatus. At this time, the PVA film was stretched in the width direction so as to be 5.9 folds in length of the material roll by the gripping means. An aqueous solution (an adjusting solution) including 4% by weight of potassium iodide at 30° C. was sprayed to one surface of the PVA film after the stretching process for 10 seconds by using the spraying apparatus. A water content of the PVA film was reduced by applying a drying and heating process for 1 minute under an atmosphere at 45° C. while feeding the PVA film in the longitudinal direction by the roll simultaneously with releasing of the PVA film from the gripping means, and the length in the longitudinal direction of the PVA film was contracted to 85% (a contraction ratio 15%) in comparison with just after releasing. Four rolls were totally used, the rotating speeds of the rolls were made lower sequentially toward a downstream side in a forward moving direction of the PVA film. The rotating speeds of the rolls were respectively set to 1.00 m/min, 0.9 m/min, 0.875 m/min and 0.85 m/min from an upstream side in the forward direction of the PVA film. A polarizer was obtained by applying a drying process to the PVA film after being contracted at 60° C. for 1 minute. A base material film "TD80UL manufactured by Fujifilm Corporation" was fed from the material roll, and a solution obtained by preparing a polyimide synthesized from 2,2'-bis(3,4-dicarboxyphenyl)hexafluoropropane≅6FDA and 2,2'-bis(trifluoromethyl)-4,4'-diaminobiphenyl≅PFMB≅TFMB at 15 wt % by using cyclohexanone as a solvent was applied at a thickness of 30 μm. A base material film with thin film of about 4.5 μm in thickness was obtained thereafter applying a drying process at 100° C. for 10 minutes. The retardation of the obtained base material film with thin film was measured by using "KOBRA (registered mark) 21ADH manufactured by Oji Scientific Instruments), the front retardation was 1.5 nm, and the retardation in a thickness direction was 242 nm. A base material film A with retardation was made by free-end uniaxial stretching (stretching between rolls) of the base material film with thin film at 1.1 folds in the feeding direction at 160° C. The retardation of the obtained base material film A with retardation was measured by using "KOBRA (registered mark) 21ADH manufactured by Oji Scientific Instruments), the front retardation was 54 nm, and the retardation in a thickness direction was 272 nm. In this case, a slow axis of the base material film A with retardation was the feeding direction. A polarizing plate B having a polarization axis (an absorption axis) in a parallel direction with respect to the width direction was made by bonding "TD80UL manufactured by Fujifilm Corporation" serving as a polarizer protecting film to one surface of the obtained polarizer through a PVA adhesive agent interposed therebetween, and bonding the base material film A with retardation made as mentioned above serving as a polarizer protecting film with retardation layer to the other surface through a PVA adhesive agent interposed therebetween. The optical characteristics of the obtained polarizing plate B were measured by "Spectrophotometer V7100 manufactured by JASCO Corporation", the transmittance was 42.6% and the polarization degree was 99.981%.

Mounting evaluation: A liquid crystal cell was taken out of "32 inch liquid crystal television set BRAVIA (registered mark) KDL-32F1 manufactured by Sony Corporation", and the polarizing plates A and B were mounted. The polarizing plate A was bonded in such a manner that a polarization axis of a polarizer was a horizontal direction in a viewing side of the cell. Further, the polarizing plate B was bonded to a back light side of the cell in such a manner that the polarization axis was a vertical direction. At this time, the polarizing plate B was bonded in such a manner that the side of the base material film A with retardation was a cell side. A contrast of the obtained television set was measured by "brightness photometer BM-5A manufactured by Topcon Corporation". The contrast was "2546".

Reference Example 2

Preparation of polarizing plate C: A base material film "TD80UL manufactured by Fujifilm Corporation" was fed from a material roll, and a solution obtained by preparing a polyimide synthesized from 2,2'-bis(3,4-dicarboxyphenyl) hexafluoropropane≅6FDA and 2,2'-bis(trifluoromethyl)-4, 4'-diaminobiphenyl≅PFMB≅TFMB at 15 wt % by using cyclohexanone as a solvent was applied at a thickness of 20 μm. A base material film with thin film of about 3 μm in thickness was obtained thereafter applying a drying process at 100° C. for 10 minutes. The retardation of the obtained base material film with thin film was measured by using "KOBRA (registered mark) 21ADH manufactured by Oji Scientific Instruments), the front retardation was 1.2 nm, and the retardation in a thickness direction was 188 nm. A base material film B with retardation was made by fixed-end uniaxial stretching (tenter stretching) of the base material film with thin film at 1.19 folds in the width direction at 160° C. The retardation of the obtained base material film B with retardation was measured by using "KOBRA (registered mark) 21ADH manufactured by Oji Scientific Instruments), the front retardation was 56 nm, and the retardation in a thickness direction was 270 nm. In this case, a slow axis of the base material film B with retardation was the width direction. A polarizing plate C having a polarization axis (an absorption axis) in an orthogonal direction with respect to the width direction was made by bonding "TD80UL manufactured by Fujifilm Corporation" serving as a polarizer protecting film to one surface of the polarizer which was made in the same manner as in the polarizing plate A through a PVA adhesive agent interposed therebetween, and bonding the base material film B with retardation made as mentioned above serving as a polarizer protecting film with retardation layer to the other surface through a PVA adhesive agent interposed therebetween. The optical characteristics of the obtained polarizing plate C were measured by "Spectrophotometer V7100 manufactured by JASCO Corporation", the transmittance was 41.0% and the polarization degree was 99.995%.

Preparation of polarizing plate D: A polarizing plate D having a polarization axis (an absorption axis) in a parallel direction with respect to the width direction was made by bonding "TD80UL manufactured by Fujifilm Corporation" serving as a polarizer protecting film to both surfaces of the polarizer which was made in the same manner as in the polarizing plate B through a PVA adhesive agent interposed therebetween. The optical characteristics of the obtained polarizing plate D were measured by "Spectrophotometer V7100 manufactured by JASCO Corporation", the transmittance was 42.6% and the polarization degree was 99.983%.

Mounting evaluation: A liquid crystal cell was taken out of "32 inch liquid crystal television set BRAVIA (registered mark) KDL-32F1 manufactured by Sony Corporation", and the polarizing plates C and D were mounted. The polarizing plate D was bonded in such a manner that a polarization axis of a polarizer was a horizontal direction in a viewing side of the cell. Further, the polarizing plate C was bonded to a back light side of the cell in such a manner that the polarization axis was a vertical direction. At this time, the polarizing plate C was bonded in such a manner that the side of the base material film B with retardation was a cell side. A contrast of the obtained television set was measured by "brightness photometer BM-5A manufactured by Topcon Corporation". The contrast was "2173". It is found that the contrast "2173" in Reference Example 2 is inferior to the contrast "2546" in Reference Example 1.

(Example of Structure and Producing Method of Optical Film)

First, a description will be given for a polarizing plate as one example of the optical film. The polarizing plate can be obtained by laminating, for example, a tri-acetyl cellulose (TAC) film (a polarizer protecting film) to one surface of a previously produced polyvinyl alcohol film (a polarizer), and laminating a polyethylene terephthalate (PET) to the other surface.

The material roll of the polarizing plate is produced, for example, in accordance with the following producing steps. (A) Step of Obtaining Polarizer, as a previous step. In this step, the polarizer is obtained by drying a polyvinyl alcohol (PVA) film to which dyeing, crosslinking and stretching steps are applied. (B) Step of Producing Polarizing Plate. In this step, the polarizing plate is produced by laminating the TAC film to one surface of the polarizer via an adhesive, laminating the PET film to the other surface and drying. An anti-glare processing may be previously applied to the PET film coming to a viewing side of the display device. (C) Step of Laminating Release Film (Separator) and Protection Film. The separator is laminated to the TAC film surface of the polarizing plate via a strong pressure-sensitive adhesive layer, and the surface protecting film is laminated to the PET film surface via a weak pressure-sensitive adhesive layer. In this case, the strong pressure-sensitive adhesive layer is previously coated on the separator, and the weak pressure-sensitive adhesive layer is coated on the surface protecting film. The strong pressure-sensitive adhesive layer coated on the separator is transferred to the TAC film after peeling off the separator. Further, the weak pressure-sensitive adhesive layer coated on the surface protecting film keeps being formed on the surface protecting film even after peeling off the surface protecting film, and is not substantially transferred to the PET film. In the previous step mentioned above, the long sheet material is produced, is wound as a roll shape, and is provided to the later step.

In the previous steps (A, B, C), a predetermined inspection is carried out by an inspector per each step. For example, in the case of the step (A), the inspector checks out the defect (the contaminant, the dirty, the torsion and the like) by a visual observation, in step of the feeding of the PVA material. Further, in the case of the step (B), the inspector checks out the defect (the contaminant, the dirty, the knick, the torsion, the kink and the like) at timings of the winding start and the winding end by a visual observation, at a time of winding the obtained polarizing plate material in the roll shape. Further, the polarizing plate material after being laminated is automatically inspected by the inspecting apparatus (the known apparatus for determining the defect by photographing the contaminant, the dirty and the like by the camera and image processing), and the defect is confirmed by the monitor.

Further, in the case of the step (C), the inspector carries out a grading (non-defective, defective, propriety of shipment) of the sheet material by checking out the defect (the contaminant, the dirty, the torsion and the like) at timings of the winding start and the winding end by the visual observation, at a time of winding the obtained long sheet material in the roll shape, and evaluating the defect.

Next, (D) Slit Step of Material roll, as a post step. Since the material roll is wide, the material roll is slit into a predetermined size in conformity to the size of the optical display device corresponding to the final product. The slit step is omitted in some width of the material roll. Next, (E) Inspecting Step of Material roll. In this case, the visual observation inspection is carried out by a roll type automatic inspecting apparatus and/or the inspector, as an outer appearance inspection of the long sheet material. The roll type automatic inspecting apparatus is a known apparatus for determining the defect by photographing a winding fault, an outer appearance defect and the like by a camera, and image processing.

In the steps mentioned above, the produced material roll is put into a package and is shipped to the next step place. On the other hand, in the case that the bonding step to the liquid crystal cell is carried out in the same place, it is carried to the next step in a simplified package or an untouched state.

The optical display device produced by the present invention can be applied to an image display device such as a liquid crystal display device, an organic EL display device, a PDP and the like.

The liquid crystal display device can be formed in accordance with the conventional way. In other words, the liquid crystal display device is generally formed by appropriately assembling component parts such as a liquid crystal cell, an optical film and a lighting system as occasion demands and installing a driving circuit. With regard to the liquid crystal cell, the present invention is effective, for example, in a case where it is a liquid crystal cell of VA mode or IPS mode.

It is possible to form an appropriate liquid crystal display device such as a liquid crystal display device in which the optical film is arranged in one side or both sides of the liquid crystal cell, one in which a backlight or a reflector is used in the lighting system, and the like. In this case, the optical film can be placed in one side or both sides of the liquid crystal cell. In the case that the optical film is provided in both sides, they may be the same or may be different. Further, at a time of forming the liquid crystal display device, it is possible to arrange appropriate parts, for example, a diffusion plate, an anti-glare layer, an anti-reflection film, a protective plate, a prism array, a lens array sheet, a light diffusion plate, a backlight and the like at appropriate positions in one layer or two layers or more.

The liquid crystal display device can be formed as a device having an appropriate structure based on conventional transmitting type, reflecting type or transmitting and reflecting both-way type in which the optical film is arranged in one side or both sides of the liquid crystal cell. Accordingly, the liquid crystal cell forming the liquid crystal display device is optional, for example, it is possible to use an appropriate type of liquid crystal cell such as an active matrix drive type represented by a thin film transistor type.

Further, in the case that the polarizing plate or the optical member is provided in both sides of the liquid crystal cell, they may be the same or may be different. Further, at a time of forming the liquid crystal display device, it is possible to arrange appropriate parts, for example, a prism array sheet, a lens array sheet, a light diffusion plate, a backlight and the like at appropriate positions in one layer or two layers or more.

The invention claimed is:

1. A system for manufacturing a rectangular optical display device by cutting an optical film in a width direction to be a predetermined size, which is fed from a material roll formed by winding said optical film including a polarizer, and bonding the optical film to a rectangular liquid crystal cell of VA mode, comprising:
   a first feeder feeding a first optical film from a first material roll, which is formed by winding said first optical film having a width corresponding to a length of a short side of said liquid crystal cell, in a direction perpendicular to the width direction, the first optical film having an absorption axis which extends in a direction perpendicular to the width direction;
   a second feeder feeding a second optical film from a second material roll, which is formed by winding said second optical film having the same width as that of said first optical film and is arranged in such a manner that a width direction is arranged parallel to the width direction of said first material roll, in a direction perpendicular to the width direction, the second optical film including the polarizer having an absorption axis which extends in the width direction and a retardation layer bonded thereto having a slow axis which extends in a direction perpendicular to the width direction;
   a first cutting apparatus cutting the first optical film fed from said first feeder in an interval corresponding to a length of the long side of said liquid crystal cell;
   a second cutting apparatus cutting the second optical film fed from said second feeder in the same interval as that of said first optical film;
   a first bonding apparatus bonding a cut piece of said first optical film to one surface of said liquid crystal cell; and
   a second bonding apparatus bonding a cut piece of said second optical film to the other surface of said liquid crystal cell in such a manner that the retardation layer is arranged at the side of the rectangular liquid crystal cell,
   wherein said first optical film is bonded to a front surface of the liquid crystal cell in a way that the absorption axis of the first optical film extends in a horizontal direction, the front surface and the horizontal direction being defined under condition at a time of viewing the optical display device,
   and wherein said second optical film is bonded to a back surface of the liquid crystal cell in a way that the absorption axis of the polarizer extends in a vertical direction and the slow axis of the retardation layer extends in a horizontal direction, the back surface, the vertical direction and the horizontal direction being defined under condition at a time of viewing the optical display device.

2. The system for manufacturing a rectangular optical display device according to claim 1, wherein the system is constructed in such a manner that a period for which said first bonding apparatus bonds said first optical film to said one surface of said liquid crystal cell and a period for which said second bonding apparatus bonds said second optical film to said other surface of said liquid crystal cell overlap at least partly.

3. The system for manufacturing a rectangular optical display device according to claim 1 or 2, further comprising a film positioning apparatus carrying out relative positioning between said first optical film and said second optical film.

4. A method for manufacturing a rectangular optical display device by cutting an optical film in a width direction to be a predetermined size, which is fed from a material roll formed by winding said optical film including a polarizer, and bonding the optical film to a rectangular liquid crystal cell of VA mode, comprising:
   a first feeding step of feeding a first optical film from a first material roll, which is formed by winding said first optical film having a width corresponding to a length of a short side of said liquid crystal cell, in a direction perpendicular to the width direction, the first optical film having an absorption axis which extends in a direction perpendicular to the width direction;
   a second feeding step of feeding a second optical film from a second material roll, which is formed by winding said second optical film having the same width as that of said first optical film and is arranged in such a manner that a width direction is arranged parallel to the width direction of said first material roll, in a direction perpendicular to the width direction, the second optical film including the polarizer having an absorption axis which extends in the width direction and a retardation layer bonded thereto having a slow axis which extends in a direction perpendicular to the width direction;
   a first cutting step of cutting the first optical film fed in said first feeding step in an interval corresponding to a length of the long side of said liquid crystal cell;
   a second cutting step of cutting the second optical film fed in said second feeding step in the same interval as that of said first optical film;

a first bonding step of bonding a cut piece of said first optical film to one surface of said liquid crystal cell; and a second bonding step of bonding a cut piece of said second optical film to the other surface of said liquid crystal cell, wherein said first optical film is bonded to a front surface of the liquid crystal cell in a way that the absorption axis of the first optical film extends in a horizontal direction, the front surface and the horizontal direction being defined under condition at a time of viewing the optical display device, and wherein said second optical film is bonded to a back surface of the liquid crystal cell in a way that the absorption axis of the polarizer extends in a vertical direction and the slow axis of the retardation layer extends in a horizontal direction, the back surface, the vertical direction and the horizontal direction being defined under condition at a time of viewing the optical display device.

5. The method for manufacturing an optical display device according to claim 4, wherein a period for bonding said first optical film to said one surface of said liquid crystal cell in said first bonding step and a period for bonding said second optical film to said other surface of said liquid crystal cell in said second bonding step overlap at least partly.

6. The method for manufacturing an optical display device according to claim 4 or 5, further comprising a film positioning step of carrying out relative positioning between said first optical film and said second optical film.

\* \* \* \* \*